(12) United States Patent
Yacoub

(10) Patent No.: US 7,398,212 B2
(45) Date of Patent: Jul. 8, 2008

(54) SYSTEM AND METHOD FOR QUALITY OF SERVICE MANAGEMENT WITH A CALL HANDLING SYSTEM

(75) Inventor: Sherif Yacoub, Sant Cugat del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 843 days.

(21) Appl. No.: 10/831,082

(22) Filed: Apr. 22, 2004

(65) Prior Publication Data

US 2005/0240411 A1    Oct. 27, 2005

(51) Int. Cl.
*G10L 21/06*    (2006.01)

(52) U.S. Cl. .................... 704/270.1; 379/88.04

(58) Field of Classification Search ............. 704/270.1; 379/88.04
See application file for complete search history.

(56) References Cited

FOREIGN PATENT DOCUMENTS

WO    WO02/43362    5/2002

OTHER PUBLICATIONS

Nuance Inc Website—www.nuance.com—"AccuBurst"—Jul. 2004—pp. 1-2.
Speechworks Inc Website—www.speechworks.com—Jul. 2004—pp. 1-6.
Nuance Developer Network—"White Paper"—Jul. 2004—1 page.

*Primary Examiner*—Susan McFadden

(57) ABSTRACT

A system and method for quality of service management within a call handling system is disclosed. The method discloses: initiating a dialog between a contact and an Interactive Voice Response (IVR) module; matching the contact with a predefined contact category; retrieving a predefined quality of service level associated with the contact category; and processing the dialog in accordance with the quality of service level. The system discloses means for effecting the method.

21 Claims, 4 Drawing Sheets

SYSTEM AND METHOD FOR QUALITY OF SERVICE MANAGEMENT WITH A CALL HANDLING SYSTEM

CROSS-REFERENCE TO RELATED OR CO-PENDING APPLICATIONS

This application relates to U.S. patent Ser. No. 10/354,415, entitled "Two Engine Speech Recognition," filed on Jan. 30, 2003, by Sherif Yacoub; U.S. patent Ser. No. 10/339,423, entitled "Commercial Automatic Speech Recognition Engine Combinations," filed on Jan. 9, 2003, by Xiaofan Lin; U.S. patent Ser. No. 10/668,121, entitled "System And Method With Automated Speech Recognition Engines," filed on Sep. 23, 2003, by Yacoub et al.; U.S. patent Ser. No. 10/668,141, entitled "System And Method Using Multiple Automated Speech Recognition Engines," filed on Sep. 23, 2003, by Sherif Yacoub; and U.S. patent Ser. No. 10/776,569, entitled "System And Method For Prioritizing Contacts," issued on Feb. 11, 2004, by Yacoub et al. These related applications are commonly assigned to Hewlett-Packard Development Co. of Houston, Tex.

BACKGROUND OF THE INVENTION

1. Field of the Invention

The present invention relates generally to systems and methods for call handling, and more particularly to quality of service management within a call handling system.

2. Discussion of Background Art

Automated call handling systems, such as Interactive Voice Response (IVR) systems, using Automatic Speech Recognition (ASR) and Text-to-speech (TTS) software are increasingly important tools for providing information and services to contacts, such as customers, in a more cost efficient manner. IVR systems are typically hosted by call centers that enable contacts to interact with corporate databases and services over a telephone using a combination of voice speech signals and telephone button presses. IVR systems are particularly cost effective when a large number of contacts require data or services that are very similar in nature, such as banking account checking, ticket reservations, etc., and thus can be handled in an automated manner often providing a substantial cost savings due to a need for fewer human operators.

The IVR systems ability to recognize a customer's speech signals is a major factor in the customer's perception of the quality of service provided by the call center. Due to the importance of understanding one's customers, many call center's attempt to provide a very robust set of ASR classifiers for interpreting the customer's speech signals. However in order to implement such a robust ASR system, call centers must invest in a substantial amount of hardware resources as well as a complex, time consuming set of ASR classifiers. The costs of implementing such a system may however be so high as to make such an IVR system impractical for some companies and service providers. Such providers may then need to resort to either an inferior set of ASR tools or a greater number of human operators.

Some call centers attempt to balance the ASR classifier costs with the benefits of having an IVR system by selecting a predetermined number of ASR classifiers for interpreting the contact's speech signals that fall within the call center's current budget. However, such monolithic approaches can in some implementations result in an inordinate number of speech recognition errors for hard to understand contacts who not only are disappointed with the call center experience, but who also must be shifted over to more costly human operators in order to complete the call. In other implementations, such a monolithic approach can result in a much higher per caller cost, since many callers could have been understood using just one ASR classifier, but instead the call center used a much larger number of ASR classifiers resulting in a greater fixed cost to the call center.

Other call centers attempt to balance the ASR classifier costs with the benefits of having an IVR system by using a greater number of ASR classifiers to understand the contact based on the availability of hardware resources, such as processor power and available memory, within the call center. Such a system thus would tend to provide a degraded quality of service level during peak calling times, and perhaps would only provide an acceptable quality of service level during slow times.

In response to the concerns discussed above, what is needed is a system and method for quality of service management that overcomes the problems of the prior art.

SUMMARY OF THE INVENTION

The present invention is a system and method for quality of service management within a call handling system. The method of the present invention includes the elements of: initiating a dialog between a contact and an Interactive Voice Response (IVR) module; matching the contact with a predefined contact category; retrieving a predefined quality of service level associated with the contact category; and processing the dialog in accordance with the quality of service level.

The system of the present invention, includes all means for implementing the method. These and other aspects of the invention will be recognized by those skilled in the art upon review of the detailed description, drawings, and claims set forth below.

DETAILED DESCRIPTION OF THE PREFERRED EMBODIMENT

The present invention teaches a system and method for varying a quality of service provided by a contact handling system to a set of contacts. Typically the call handling system is implemented within a call center that services customer contacts, however, the present invention can be implemented in many different environments as well. The quality of service provided can be defined in a variety of ways, including the system's speech recognition performance, average call waiting time, level of functionality, and so on. So while the present invention is primarily discussed with respect to quality of service defined in terms of the system's speech recognition performance, the teachings of the present invention apply to other quality of service definitions known to those skilled in the art as well.

The present invention includes not only a system and method for varying the quality of service level provided to the contact but also a system and method for distinguishing contacts from each other so that differing quality of service levels can be provided to each. Such contact differentiation can include, differentiating the contacts by a level of contact importance and by the contact's service level agreement with the system. The quality of service level can be varied by effecting a greater number of speech recognition techniques for more important contacts, while effecting a smaller number of techniques for less important contacts.

Thus the present invention teaches how to vary quality of service based on one or more contact variables regardless of what computational resources are available to the call handling system.

Figure 1:
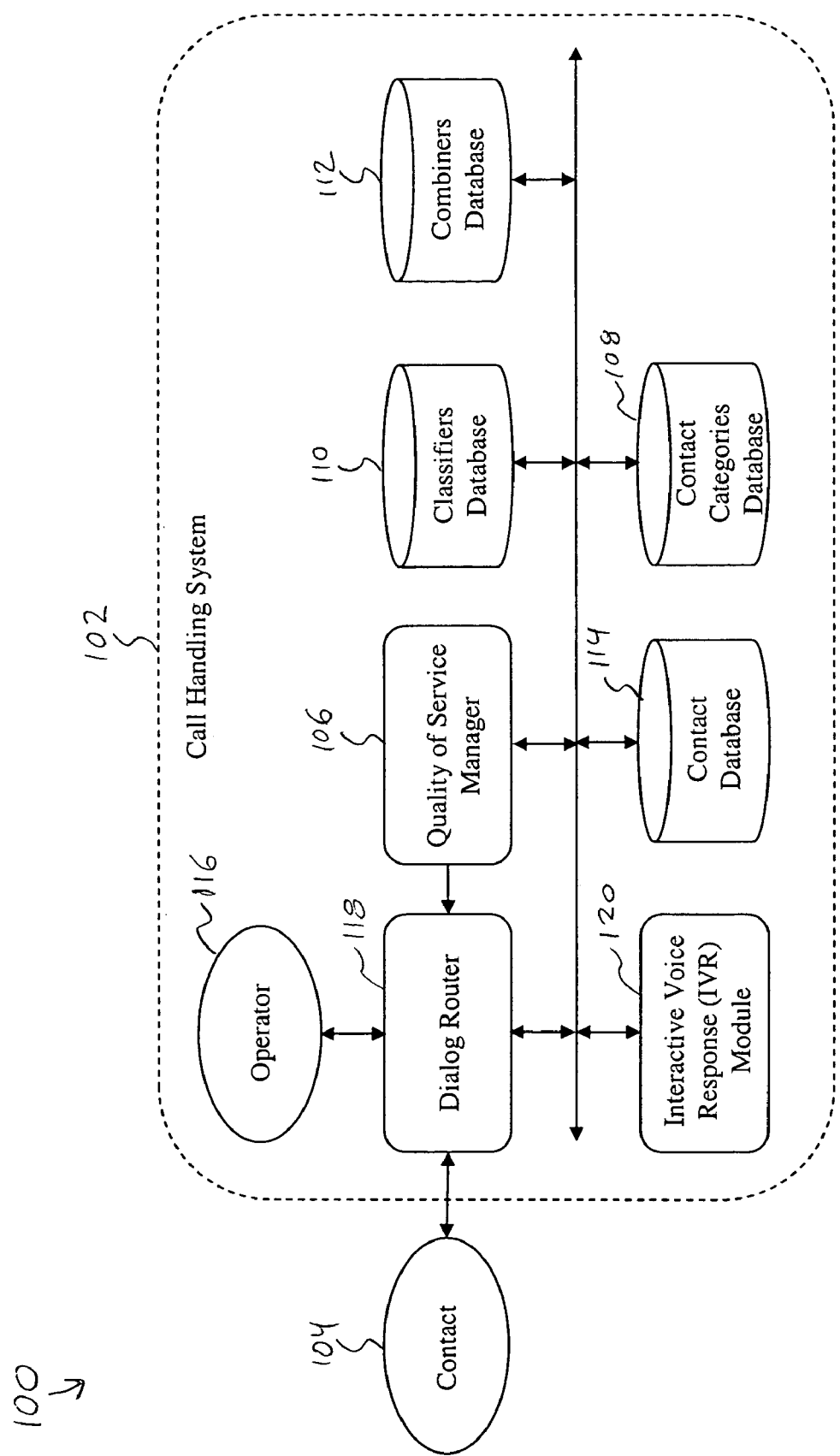
FIG. 1 is a dataflow diagram of one embodiment of a system for quality of service management within a call handling system.

FIG. 1 is a dataflow diagram 100 of one embodiment of a system for quality of service management within a call handling system 102. The call handling system 102 preferably provides some type of voice interactive information management service to a contact 104. Anticipated information services include those associated with customer response centers, enterprise help desks, business generation and marketing functions, competitive intelligence, and many others. Contacts include customers, employees, or any party in need of the call handling system's 102 services. Also while the discussion below is sometimes discussed with respect to only one contact 104, the invention's functionality applies to a set of contacts as well.

Define Contact Categories

To begin, a Quality of Service (QoS) manager 106 stores a predefined set of contact categories in a contact categories database 108. The predefined set of contact categories preferably vary with each application of the present invention. In one embodiment of the system 102 there is a different contact category for each: specific contacts (e.g. Mr. Smith); service level agreement (SLA); business importance level; company name or division; professional title (e.g. president, manager, etc.); volume of business; status (e.g. "first time caller", "always forward directly to an operator", etc.); reason for calling (e.g. product recall, technical support request, etc.); call history; geographic residence (e.g. long distance caller, or local caller); and so on. Those skilled in the art will know of many other contact categories. These categories are preferably defined by a system user (not shown) according to a set of best business practices common to the industry or application of the present invention.

Define Quality of Service Levels

Next, the QoS manager 106 assigns a Quality of Service (QoS) level to each contact category. The Quality of Service levels preferably vary with the present invention's application. Some exemplary Quality of Service levels include: high, medium, low; QoS-1, QoS-2, . . . QoS-n (where n is a number); and so on. Those skilled in the art will recognize any number of QoS levels and identifiers. Some contact categories may even have the same QoS level, depending upon how the system user configures the system 102. Some exemplary QoS level variations are now described.

Quality of Service Level based on Classifier Performance

One preferred way of varying the QoS level is by adjusting a number, of classifiers and combiners used by the system 102 to interpret speech signals (i.e. utterances) and text (e.g. e-mail) received from a contact, and their respective performance levels. Performance is herein relatively defined by a system user, for example in one embodiment performance describes how accurately a classifier interprets the dialog, whereas in another embodiment performance describes how fast a classifier interprets the dialog. The classifiers may include acoustic classifiers, keyword classifiers, and business relevance classifiers, each of which generates a set of confidence scores with respect to the contact's 104 speech signals and text messages. The combiners combine those confidence scores using a variety of techniques, including: a weighted product combination; weighted linear summation; a weighted exponential; and neural nets. The classifiers are stored in a classifiers database 110, and the combiners are stored in a combiners database 112. A brief description of some classifiers and combination techniques now follows.

Acoustic Classifier

An acoustic classifier generates a set of confidence scores that help identify the contact's 104 words and emotional state based on a set of acoustic features found within the contact's 104 speech signals. The set of acoustic features may include: speech signal pitch contour statistics, contour statistics of the first derivative of the pitch, energy contour statistics, contour statistics of the first derivative of the energy, and audible and inaudible duration features. A confusion matrix may also be used to help assign the confidence scores.

Keyword Classifier

A keyword classifier searches textual messages received from the contact 104 for predetermined set of keywords or key phrases. The set of keywords and key phrases are preferably prepared off-line and expanded using natural language processing techniques (e.g. hyponym expansion using WordNet). The keywords are stored in a database (not shown) or a look-up table. The set of keywords can also be readily adjusted to search for keywords and phrases in many other languages. The keyword classifier generates a set of confidence scores base on whether the message includes a predefined set and number of keywords and key phrases.

Business Relevance Classifier

A business relevance classifier searches the contact's 104 textual messages for a predetermined set of business relevance keywords related to a predefined set of business relevance categories. Depending upon an application of the present invention, these business relevance categories may include: name or division of the company from which the contact 104 is calling; who the contact 104 is at the company (e.g. president, manager, etc.); volume of business done with the contact 104; if the contact 104 is calling about a unique problem (e.g. a recall); whether the contact 104 has a service contract; historical data associated with the contact 104, such as the contact's 104 prior reasons for contacting the system 102, and so on. Those skilled in the art will know of many other business relevance categories.

The business relevance classifier sets confidence scores to predetermined values based on whether the contact's 104 message includes a predefined set and number of the business relevance keywords. The business relevance keywords are stored in a database (not shown) or a look-up table.

Combiner

A combiner retrieves each of the confidence scores generated by the various classifiers. The combiner may assign differing weights to each of the confidence scores as well, depending upon the classifier from which the confidence score was received. The weighting can be revised using ground truth data from the ongoing activities of the call handling system 102.

The data combiner calculates a combined confidence score based on a selected set of the confidence scores received from the various classifiers. The combined confidence score can be calculated in several different ways depending upon how statistically independent the different classifiers are. For instance, an equal-weighted product combination method equally weights and multiplies together the confidence score from each of the classifiers to yield the combined confidence score.

A weighted linear summation method, combines confidence scores according to the following formula:

$$S = \sum_{j=1}^{N} r_j p_j$$

where N is a total number of classifiers, r is a weight assigned to classifier j, and Pj is a confidence score generated by Classifier j)

A the weighted exponential method, combines confidence scores according to the following formula:

$$S = \prod_{j=1}^{N} p_j^{r_j}$$

(where N is a total number of classifiers, r is a weight assigned to classifier j, and Pj is a confidence score generated by Classifier j)

A neural net method could use a Multiple Layer Perception (MLP) network, with the various confidence scores (i.e. $\{p_1, p_2, \ldots, p_N\}$) as the input.

Confidence score combination is important since overall classifier accuracy is improved when multiple classifiers are used. Also, since each of the classifier's computational complexity may vary, varying QoS levels can be provided to the contact 104 using a hierarchical QoS level strategy, such as by identifying a set of computational resources required by each classifier to calculate a confidence level score; and generating the various confidence level scores hierarchically beginning with that classifier requiring a least amount of computational resources.

One embodiment for varying the QoS level includes: using a three classifier majority voting techniques for providing a highest QoS level; using a two classifier confusion-matrix based combination technique for providing a medium QoS level; and using only one classifier for providing a regular QoS level.

Other Quality of Service Level Variations

Other ways of varying the QoS level can be effected by adjusting the contact's 104 call waiting time, or by how much system 102 functionality the contact 104 can access. Those skilled in the art will recognize other ways of varying a QoS level.

Engage Contact

Next, a contact 104 initiates a communications link with the call handling system 102. The QoS manager 106 acknowledges the communications link and collects identifying information about the contact 104. The identifying information varies with each implementation of the present invention. For example: contacts having an existing SLA may simply provide their SLA number; some frequent contacts can be recognized using a voice authentication system to match the contact's 104 voiceprint with an existing voiceprint stored in a contact database 114; the importance of the contact's business or the contact's company name, division, and professional title could be gleaned using automated speech recognition technology; and telephone caller identification tools can localize the contact's geographic residence base on the area code from which the contact 104 is calling.

The QoS manager 106 identifies the contact 104 by comparing the identifying information with data stored in the contact database 114. The QoS manager 106 matches the contact 104 with a contact category within the contact categories database 108.

If the contact's 104 contact category indicates that the contact should be connected directly to an operator 116, the QoS manager 106 commands a dialog router 118 to connect the contact 104 to the operator 116 so that a dialog with the operator 116 can begin. Otherwise, the QoS manager 106 commands the dialog router 118 to connect the contact 104 to an Interactive Voice Response (IVR) module 120 so that a dialog with the IVR module 120 can begin. A dialog is herein preferably defined to include communications between the contact 104 and either the IVR module 120 or the operator 116. While the present invention is described with reference to a dialog including mostly speech signals, alternate embodiments can have dialogs that are mostly textual messages, such as e-mail.

The IVR module 120 provides an automated interface between the contact's 104 speech signals and text messages, received over a voice channel, and the system's 102 overall functionality. To support such an interface with the contact 104, the IVR module 120 may employ a Text-To-Speech (TTS) translator, Natural Language Processing (NLP) algorithms, Automated Speech Recognition (ASR), and various other dialog interpretation (e.g. a Voice-XML interpreter) tools.

The IVR module 120 typically receives information requests and responses from the contact 104 during the dialog which are then used to either look-up or store information for the benefit of the contact 104. Depending upon how a dialog with the IVR module 120 progresses, the QoS manager 106 may eventually connect the contact 104 to the operator 116.

Provide Quality of Service Level to Contact

The QoS manager 106 retrieves the QoS level associated with the contact's 104 contact category. The QoS manager 106 processes the dialog in accordance with the identified QoS level. For example, if the contact 104 was connected directly to the operator 116, the QoS manager 106 may simply display a set of contact handling instructions to the operator 116 that are appropriate to the contact's 104 QoS level. If on the other hand, the contact 104 is in dialog with the IVR module 120, the QoS manager 106 may configure the IVR module 120 so as to provide the identified QoS level to the contact 104.

Quality of Service Level based on Classifier Performance

One preferred way of providing a predefined QoS level to the contact 104 is by adjusting a classifier's, such as an Automated Speech Recognition Classifier's, performance. In one example of such a preferred embodiment, the QoS manager 106 selects a set of classifiers to receive the contact's 104 speech signal, based on the contact's 104 QoS level. The QoS manager 106 configures a set of performance parameters associated with each of the selected classifiers, based on the contact's 104 QoS level. The QoS manager 106 selects a set of computer resources to execute each of the classifier routines, based on the contact's 104 QoS level. The QoS manager 106 selects a combiner from the combiners database 112 for combining the confidence scores generated by each of the classifiers, based on the contact's 104 QoS level.

Figure 2:
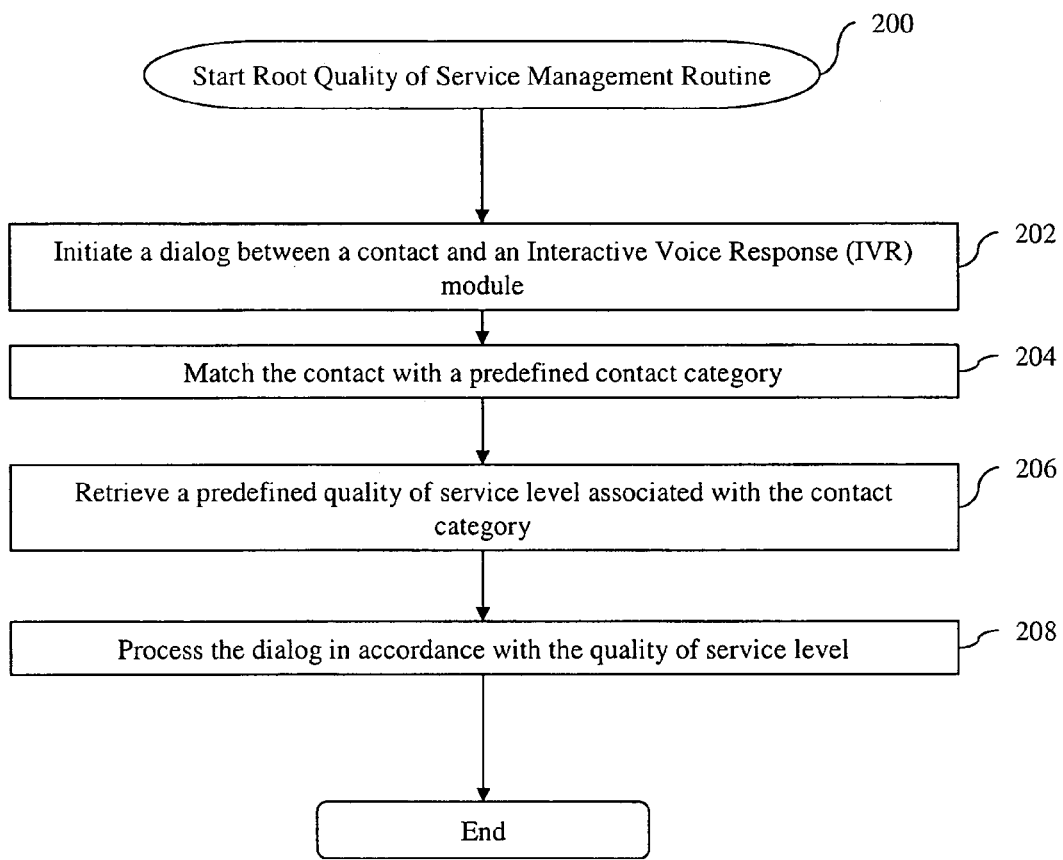
FIG. 2 is a root flowchart of one embodiment of a method for quality of service management within a call handling system.

FIG. 2 is a root flowchart of one embodiment of a method 200 for quality of service management within the call handling system 102. The method 200 begins in step 202 where a dialog between the contact 104 and the Interactive Voice Response (IVR) module 120 is initiated. Next in step 204, the contact 104 is matched with a predefined contact category stored in the contact categories database 108. In step 206, a predefined quality of service level associated with the contact category is retrieved. Then in step 208, the dialog is processed in accordance with the quality of service level. The root method 200 is discussed in further detail with respect to FIG. 3.

Figure 3A:
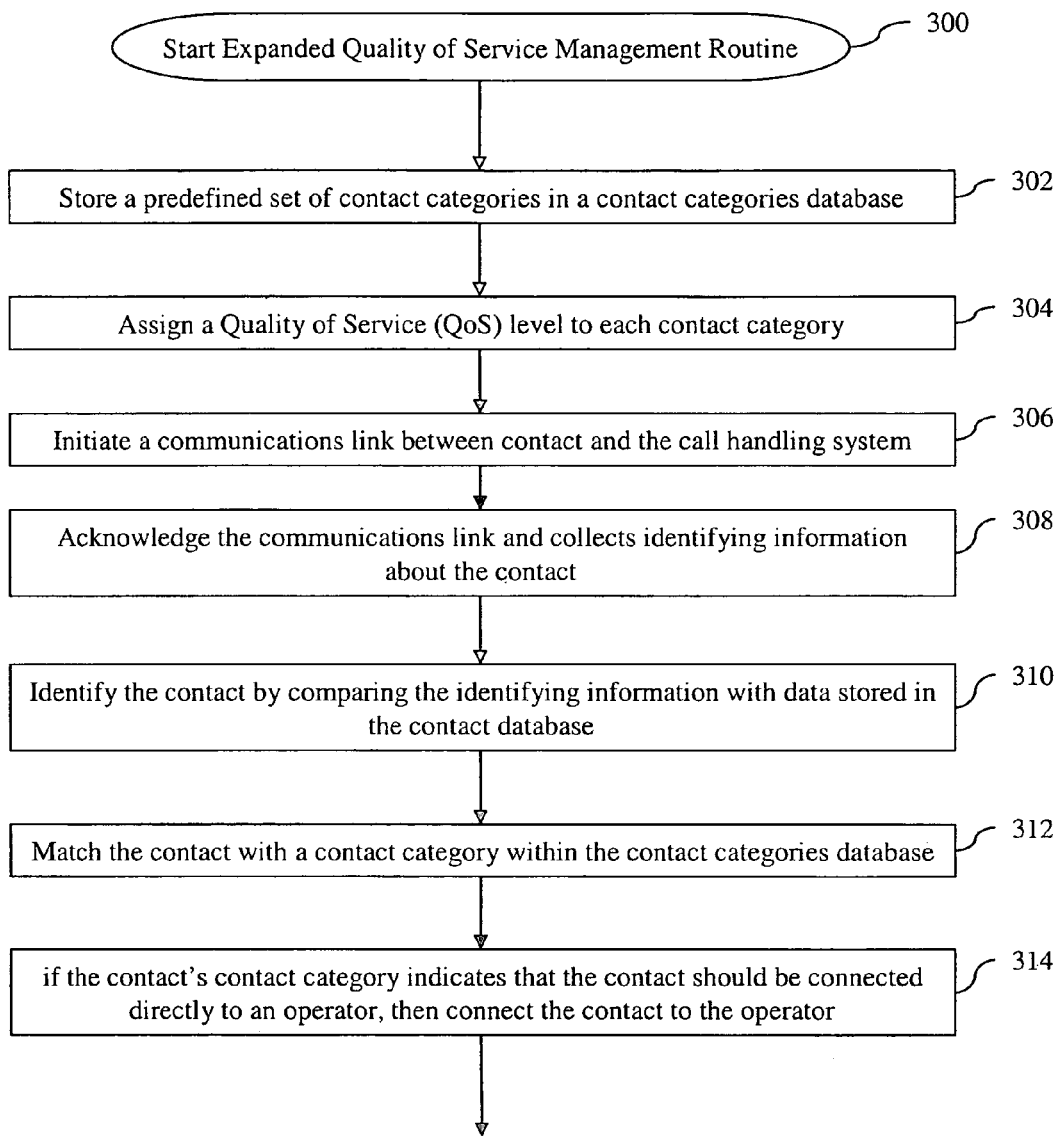
FIG. 3 is a flowchart of one embodiment of a method for quality of service management within a call handling system.
Figure 3B:
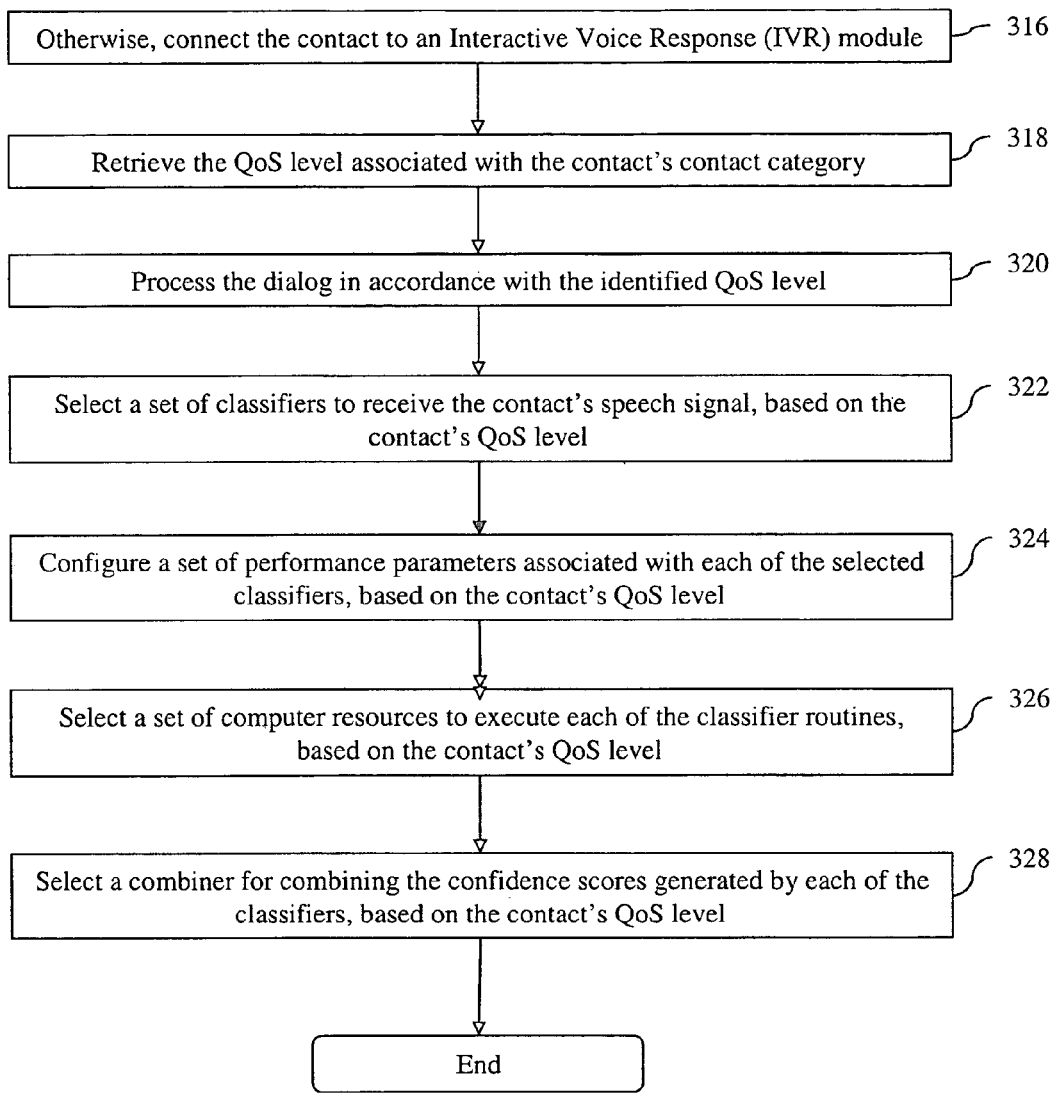

FIG. 3 is a flowchart of one embodiment of a method 300 for quality of service management within the call handling system 102. To begin, in step 302, a Quality of Service (QoS) manager 106 stores a predefined set of contact categories in a contact categories database 108. Next in step 304, the QoS manager 106 assigns a Quality of Service (QoS) level to each contact category. In step 306, a contact 104 initiates a communications link with the call handling system 102. In step 308, the QoS manager 106 acknowledges the communications link and collects identifying information about the contact 104.

In step 310, the QoS manager 106 identifies the contact 104 by comparing the identifying information with data stored in the contact database 114. In step 312, the QoS manager 106 matches the contact 104 with a contact category within the contact categories database 108.

In step 314, if the contact's 104 contact category indicates that the contact should be connected directly to an operator 116, the QoS manager 106 commands a dialog router 118 to connect the contact 104 to the operator 116 so that a dialog with the operator 116 can begin. Otherwise, in step 316 the QoS manager 106 commands the dialog router 118 to connect the contact 104 to an Interactive Voice Response (IVR) module 120 so that a dialog with the IVR module 120 can begin.

In step 318, the QoS manager 106 retrieves the QoS level associated with the contact's 104 contact category. In step 320, the QoS manager 106 processes the dialog in accordance with the identified QoS level.

In one example, in step 322, the QoS manager 106 selects a set of classifiers to receive the contact's 104 speech signal, based on the contact's 104 QoS level. In step 324, the QoS manager 106 configures a set of performance parameters associated with each of the selected classifiers, based on the contact's 104 QoS level. In step 326, the QoS manager 106 selects a set of computer resources to execute each of the classifier routines, based on the contact's 104 QoS level. In step 328, the QoS manager 106 selects a combiner from the combiners database 112 for combining the confidence scores generated by each of the classifiers, based on the contact's 104 QoS level.

While one or more embodiments of the present invention have been described, those skilled in the art will recognize that various modifications may be made. Variations upon and modifications to these embodiments are provided by the present invention, which is limited only by the following claims.

What is claimed is:

1. A method for quality of service management within a call handling system, comprising:
    collecting information from a dialog between a contact and a call handling system;
    matching the contact with a predefined contact category, the contact category indicating whether the contact is to be connected to an operator or an Interactive Voice Response (IVR) module, wherein matching the contact is based on information collected from the dialog;
    retrieving a predefined quality of service level associated with the predefined contact category; and
    providing a dialog service in accordance with the predefined quality of service level.

2. The method of claim 1, wherein matching includes matching the contact with a service level agreement.

3. The method of claim 1, wherein matching includes matching the contact with a contact name.

4. The method of claim 1, wherein matching includes matching the contact with a reason for calling.

5. The method of claim 1, wherein processing includes connecting the contact directly to an operator.

6. The method of claim 1, wherein processing includes minimizing a call waiting time.

7. The method of claim 1, wherein processing includes providing a predefined level of functionality within the system.

8. The method of claim 1, wherein processing includes adjusting performance of an automated speech recognition classifier used by the IVR module.

9. The method of claim 1, wherein processing includes selecting a set of automated speech recognition classifiers used by the IVR module.

10. The method of claim 1, wherein processing includes adjusting performance of a dialog classifier used by the IVR module.

11. The method of claim 1, wherein processing includes processing the dialog with a set of dialog classifiers used by the IVR module.

12. The method of claim 11, wherein processing includes selecting a set of computer resources to effect each classifier.

13. The method of claim 11, wherein processing includes combining a set of classifier confidence scores generated by the classifiers.

14. The method of claim 11, wherein processing includes combining a set of classifier confidence scores generated by the classifiers.

15. The method of claim 13, wherein combining includes combining the scores using weighted linear summation.

16. The method of claim 13, wherein combining includes combining the scores using a weighted exponential.

17. The method of claim 13, wherein combining includes combining the scores using a neural net.

18. The method of claim 13, wherein combining includes:
    identifying a set of computational resources required to effect each classifier; and
    effecting the classifiers hierarchically beginning with a classifier requiring a least amount of computational resources.

19. A method for quality of service management within a call handling system, comprising:
    collecting information from a dialog between a contact and a call handling system;
    matching the contact with a predefined contact category, the contact category indicating whether the contact is to be connected to an operator or an Interactive Voice Response (IVR) module, wherein matching the contact is based on information collected from the dialog;
    retrieving a predefined quality of service level associated with the predefined contact category; and
    providing a dialog service in accordance with the predefined quality of service level;
    wherein matching includes matching the contact with a service level agreement;
    wherein processing includes processing the dialog with a set of dialog classifiers used by the IVR module;

wherein processing includes adjusting performance of an automated speech recognition classifier;

wherein processing includes combining a set of classifier confidence scores generated the classifiers; and wherein combining includes, identifying a set of computational resources required to effect each classifier; and effecting the classifiers hierarchically beginning with a classifier requiring a least amount of computational resources.

20. A computer-usable medium embodying computer program code for commanding a computer to effect quality of service management within a call handling system, comprising:

collecting information from a dialog between a contact and a call handling system;

matching the contact with a predefined contact category, the contact category indicating whether the contact is to be connected to an operator or an Interactive Voice Response (IVR) module, wherein matching the contact is based on information collected from the dialog;

retrieving a predefined quality of service level associated with the predefined contact category; and providing a dialog service in accordance with the predefined quality of service level.

21. A system for quality of service management within a call handling system, comprising a:

means for collecting information from a dialog between a contact and a all handling system;

means for matching the contact with a predefined contact category, the contact category indicating whether the contact is to be connected to an operator or an Interactive Voice Response (IVR) module, wherein matching the contact is based on information collected from the dialog;

means for retrieving a predefined quality of service level associated with the predefined contact category; and means for providing a dialog service in accordance with the predefined quality of service level.

\* \* \* \* \*

UNITED STATES PATENT AND TRADEMARK OFFICE
CERTIFICATE OF CORRECTION

PATENT NO. : 7,398,212 B2
APPLICATION NO. : 10/831082
DATED : July 8, 2008
INVENTOR(S) : Sherif Yacoub It is certified that error appears in the above-identified patent and that said Letters Patent is hereby corrected as shown below:

Title Pg, Item (54), in "Title", in column 1, line 2, delete "WITH" and insert -- WITHIN --, therefor.

In column 1, line 2, delete "WITH" and insert -- WITHIN --, therefor.

In column 10, line 8, in Claim 21, delete "all" and insert -- call --, therefor.

Signed and Sealed this

Twenty-third Day of June, 2009

JOHN DOLL
*Acting Director of the United States Patent and Trademark Office*